Jan. 12, 1954

D. L. HOLLWAY ET AL 2,666,162

ELECTRONIC COUNTING DEVICE

Filed Sept. 6, 1950

13 Sheets-Sheet 1

Inventors:
D. L. Hollway and
A. M. Thompson
By Wenderoth, Lind & Ponack
Attys

Jan. 12, 1954 D. L. HOLLWAY ET AL 2,666,162

ELECTRONIC COUNTING DEVICE

Filed Sept. 6, 1950 13 Sheets-Sheet 2

Inventors:
D. L. Hollway and
A. M. Thompson
By Wenderoth, Lind & Ponack
Attys

Jan. 12, 1954 D. L. HOLLWAY ET AL 2,666,162

ELECTRONIC COUNTING DEVICE

Filed Sept. 6, 1950 13 Sheets-Sheet 3

Inventors:
D. L. Hollway and
A. M. Thompson
By Wenderoth, Lind & Ponack
Attys

Inventors:
D. L. Hollway and
A. M. Thompson
By Wenderoth, Lind & Ponack
Attys

Inventors:
D. L. Hollway and
R. M. Thompson
By Wenderoth, Lind & Ponack
Attys

Inventors:
D. L. Hollway and
A. M. Thompson
By Ockendroth, Lind & Ponack
Attys

Jan. 12, 1954 D. L. HOLLWAY ET AL 2,666,162

ELECTRONIC COUNTING DEVICE

Filed Sept. 6, 1950 13 Sheets-Sheet 7

Inventors:
D. L. Hollway and
A. M. Thompson
By Wenderoth, Lind & Ponack
Attys.

Jan. 12, 1954 D. L. HOLLWAY ET AL 2,666,162

ELECTRONIC COUNTING DEVICE

Filed Sept. 6, 1950 13 Sheets-Sheet 8

Inventors:
D. L. Hollway and
A. M. Thompson
By Wenderoth, Lind & Ponack
Attys.

Inventors:
D. L. Hollway and
R. M. Thompson
By Ottenderoth, Lind & Ponack
Attys

Jan. 12, 1954 D. L. HOLLWAY ET AL 2,666,162

ELECTRONIC COUNTING DEVICE

Filed Sept. 6, 1950 13 Sheets-Sheet 10

Inventors
D. L. Hollway and
A. M. Thompson
By Wenderoth, Lind & Ponack
Attys

Inventors:
D. L. Hollway and
A. M. Thompson
by Okendroth, Lind & Ponack
Attys

Inventors:
D. L. Hollway and
A. M. Thompson
By Ohlenderoth, Lind & Ponack
Attys

Inventors:
D. L. Hollway and
A. M. Thompson
By Wenderoth, Lind & Ponack
Attys

Patented Jan. 12, 1954

2,666,162

UNITED STATES PATENT OFFICE 2,666,162

ELECTRONIC COUNTING DEVICE

David Lipscombe Hollway, Gordon, New South Wales, and Arthur Melville Thompson, Mosman, New South Wales, Australia, assignors to Commonwealth Scientific and Industrial Research Organization, East Melbourne, Victoria, Australia Application September 6, 1950, Serial No. 183,318

Claims priority, application Australia October 21, 1949

18 Claims. (Cl. 315—21)

This invention relates to an electronic counting device designed to count electrical signals up to a desired number N, and to store and indicate the count.

Electronic counting is widely used in research, electrical computing equipment and industrial processes. Present practice is to build counters from several cascaded circuit sections, each dividing by ten, or sometimes by two. The simplest scale-of-ten circuit section so far evolved makes use of four double-triode vacuum tubes, more than thirty resistances, four neon indicator lamps, and other components. Counter circuits suitable for electronic computers use additional valves and components contributing largely to the bulk, complexity and cost of the computer.

The principal object of this invention is to provide a single electronic vacuum tube which can replace one of these cascaded sections, that is, a single vacuum tube which will count electrical signals up to a desired number N, and store and indicate the count, and if desired generate one output signal for each N input signals.

A further object is to provide such a vacuum tube counter employing electrostatic deflection of the electron beam.

A subsidiary object, which may or may not be fulfilled by a particular counter, is to provide such a vacuum tube counter giving a direct visual indication of the number counted on a fluorescent screen.

A further subsidiary object is to provide such a vacuum tube counter which does not require a special waveform, as for example a pulse waveform, for the signals to be counted. It is only necessary the signal amplitude should first rise above a critical value, and then fall below another critical value, to effect a count of one. This is achieved, as will be explained later, by having two stable states of the electron beam for each count of one. However, if pulse wave forms are to be used, then a satisfactory vacuum tube counter can be constructed in which only one stable state of the electron beam is associated with each count of one.

From one aspect this invention comprises an electronic vacuum tube counter capable of counting electrical signals greater in number than two employing a single electron tube in which the electron beam has a number of stable states equal to or a whole number multiple of the number which can be counted by the tube, and means for switching the electron beam from one stable state to a different stable state for each application of a signal to be counted.

From another aspect an electronic vacuum tube counter comprises means for generating an electron beam, a plurality of deflecting electrodes, a first set of electron-collecting electrodes equal in number to the number of deflecting electrodes, a second set of electron-collecting electrodes equal in number to the number of deflecting electrodes, each deflecting electrode being connected to one of the first set of collecting electrodes and to one of the second set of collecting electrodes, and also being connected to a source of direct potential by a resistance, the electrodes being designed and positioned so that a number of stable states for the electron beam are defined in which the electron beam impinges partly on an electrode of the first set of collecting electrodes and partly on an electrode of the second set of collecting electrodes, and so that the electron beam is unstable when substantially all the beam falls on an electrode of one of said sets only and then falls round to the next adjacent stable state, and a triggering electrode adapted when an electric signal is applied thereto to move the electron beam so that substantially all the beam falls on an electrode of one of said sets only.

Reference will now be made to the accompanying drawings in which.

*General assembly*

Figure 1:
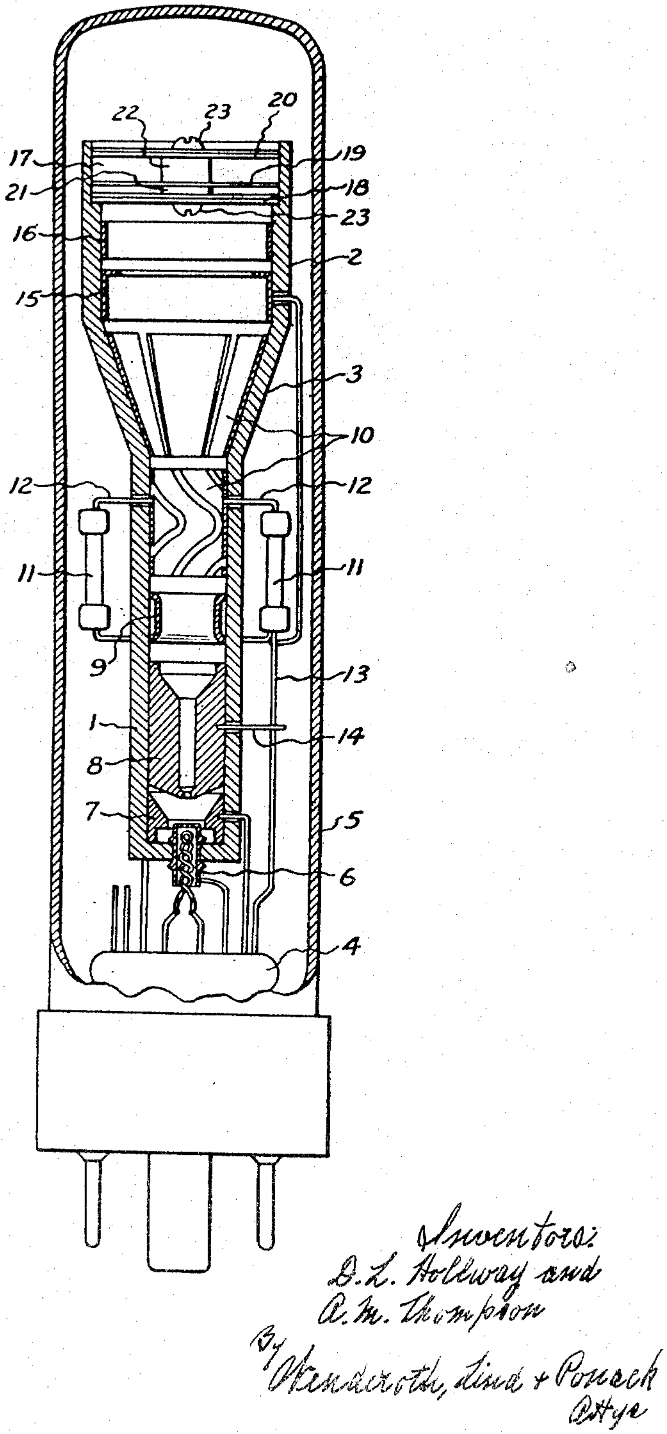
Fig. 1 is a sectional elevation showing the general assembly of a scale-of-ten electronic counter tube according to this invention.

Referring now to Fig. 1, this figure shows in part section the general construction of an electronic counter tube according to this invention and employing substantially radial deflection. The various electrodes of the tube are mounted in a ceramic shell 1 which is generally cylindrical in shape with an enlarged end part 2 and a frusto-conical part 3. Any other suitable means for mounting the electrodes may be used, such as those used in conventional radio valves. The electrodes and ceramic shell 1 are supported from a pinch 4 and are enclosed in an evacuated glass envelope 5 in the usual manner with electronic tubes. The counting device shown in this figure is a scale-of-ten counter tube having five deflecting electrodes, or the equivalent of five deflecting electrodes.

An electron gun is provided at the base of the tube and comprises an indirectly heated cathode 6, grid 7 and anode 8. Electrons from the cathode 6 are attracted toward the anode 8, which is maintained at a positive potential with respect to the cathode, and are directed toward the central aperture in the anode by the application of a zero or negative potential to the grid 7. One particular form of electron gun which has been found suitable for the counter tube is well known as the "Pierce" gun. From the aperture in the anode 8 a divergent beam of electrons travels toward a low potential electrode or focussing ring 9 which, together with the adjacent edge of the anode, forms an electrostatic lens. The part of the divergent beam within the anode which would be over-focussed by the electrostatic lens so formed is intercepted by the parallel portion of the opening in the anode.

The parts of the counter tube so far described resemble in function the electron gun components of a cathode ray tube and are not original. However, in order to increase the usefulness of the counter tube, the electron gun should be designed to operate at "low" voltages (500 volts and below) with beam currents up to one milliampere. Thus the effective perveance must be much higher than in ordinary cathode ray tube guns.

After passing the focussing ring 9 the beam passes into the electrostatic field of the deflecting electrodes indicated generally at 10. It is preferred to use only five deflecting electrodes in this scale-or-ten tube in order to simplify the construction, but ten deflectors could be used by appropriate subdivision of other electrodes. Each deflector is connected to one load resistance 11, of which only two are shown in Fig. 1, by a lead 12.

The other end of each load resistance is connected to a positive voltage supply lead 13 to which the anode is also connected by lead 14. The deflecting plates are spaced at equal intervals around the axis of the tube so that when the potential of one deflector is dropped, for example by current flowing through its load resistance, the beam is deflected substantially radially away from the axis of the tube and away from the said deflector. The deflector design will be discussed in more detail later.

The electron beam, after leaving the deflecting plates (deflectors), passes an electrode 15, in the form of an annular ring, also connected to the positive supply lead 13, and called herein the "positive ring." This electrode intercepts part of the electron beam when it is deflected sufficiently from the axis.

Immediately above positive ring 15 is a trigger electrode 16 in the form of a ring, and above this again a collector plate assembly indicated generally at 17 and consisting of a front collector system 18, a suppressor grid 19, and a back collector system 20 spaced from each other by insulating spacers 21, 22 and secured together by screws 23. The front plate system rests on a lip in the ceramic shell 1.

Figure 2:
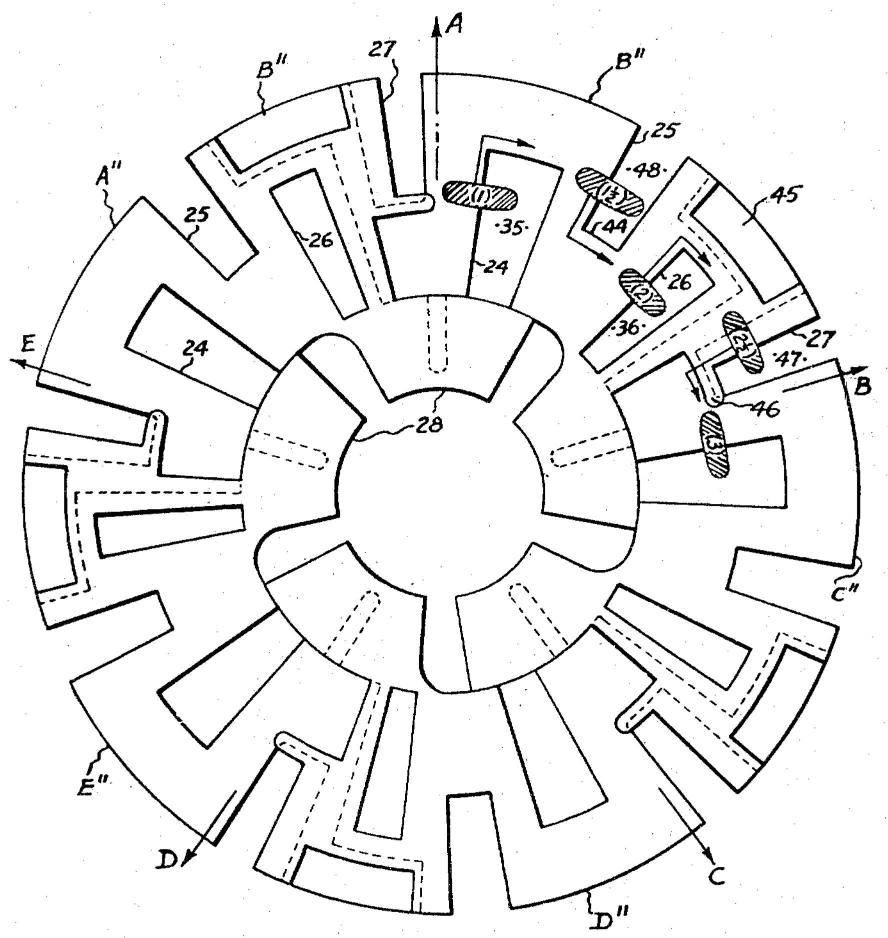
Fig. 2 is a plan view of a front collector system for use in the tube of Fig. 1 viewed from the direction of the beam.
Figure 3:
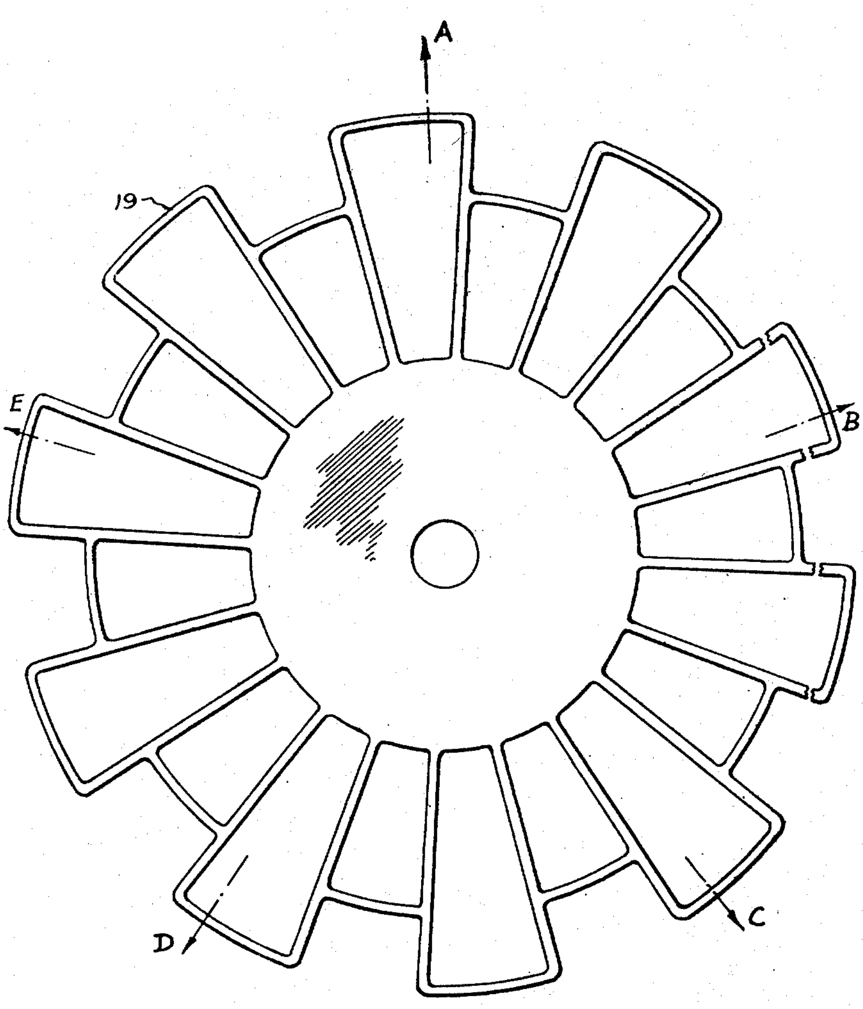
Fig. 3 is a plan view of a suppressor grid.
Figure 9:
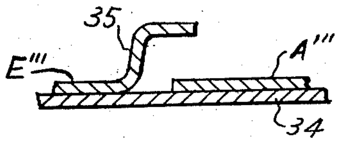
Fig. 9 is a part sectional view along the line 9—9 of Fig. 4.
Figure 4:
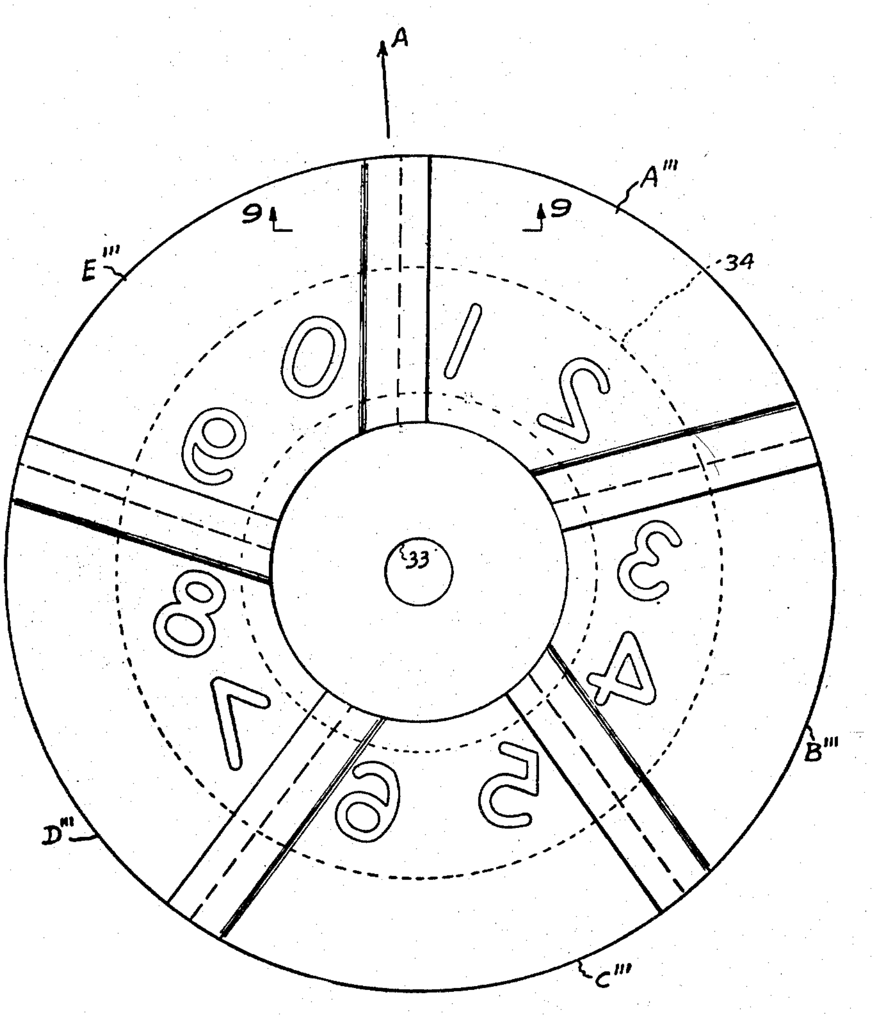
Fig. 4 is a plan view of a back collector system.
Figure 5:
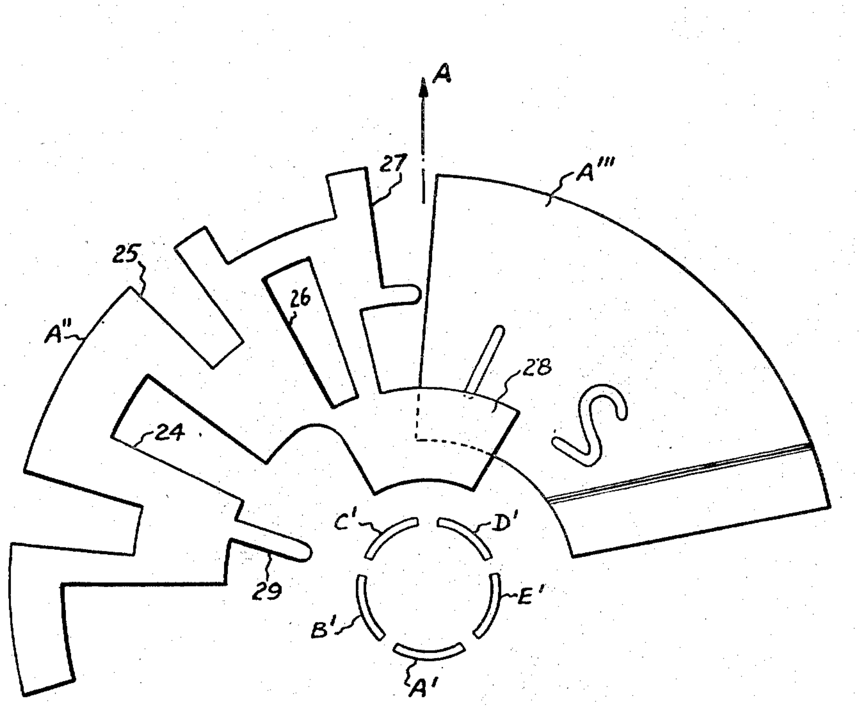
Fig. 5 is a sketch showing the relative positions of deflecting, front collector and back collector electrodes.
Figure 6:
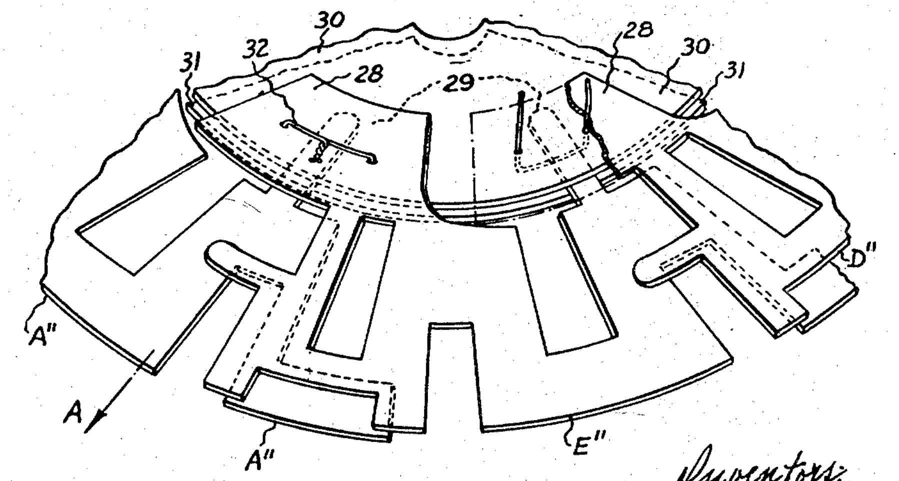
Fig. 6 is a perspective view of part of the front collector system of Fig. 2 showing details of assembly.
Figure 7:
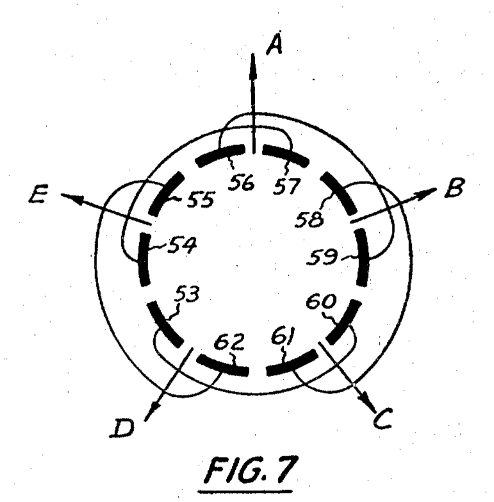
Figs. 7 and 8 are diagrams used in indicating the connections of the deflecting electrodes of Figs. 13 and 14 respectively.
Figure 8:
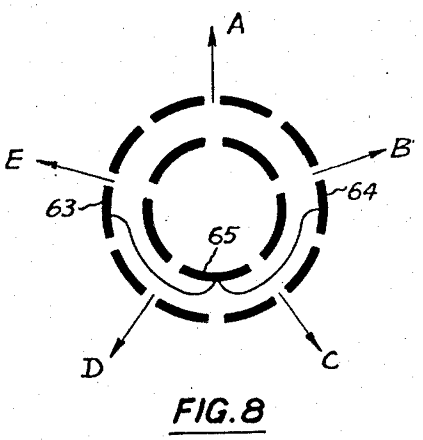

A plan view of the front collector system is shown in Fig. 2, a plan view of the suppressor grid is shown in Fig. 3, a plan view of the back collector system is shown in Fig. 4, a plan diagrammatic view showing the relative positions of deflector electrodes, front collector segments, and back collector segments is shown in Fig. 5, a perspective view of part of the front collector system showing how parts are assembled is shown in Fig. 6, and diagrammatic views of two deflector electrode systems suitable for use in the tube are shown in Figs. 7 and 8. In all these figures the letters A, B, C, D, E represent different radial directions in which the electron beam may be deflected when a particular one of the deflecting electrodes has its potential dropped. In all of Figs. 2 to 6 the electrodes are viewed in the direction of travel of the beam, that is, from below up in Fig. 1. Fig. 9 is a cross-section across part of the back collector assembly along the line 9—9 of Fig. 4.

*Collector assembly*

For convenience the deflecting electrode which produces deflection in the A direction will be lettered A′ (see Fig. 5), that which produces deflection in the B direction B′, and so on. The front collector system consists of five apertured and slotted sectors A″, B″, C″, D″, and E″, positioned as shown in Fig. 2 with portions of the sectors overlapping but spaced from each other in the axial direction by means of mica washers. The shape of the sectors, which are all similar, is best seen in Fig. 5, which shows the sector A″ and its relative angular position with respect to deflecting electrode A′. The back collector system consists of five overlapping sectors A‴, B‴, C‴, D‴, and E‴, as shown in Figs. 4 and 9. The relative angular position of the back collector sectors may be obtained from the arrow lettered A on Fig. 4 showing the A″ direction of electron beam deflection and from Fig. 5. The electrodes A', A'', A''' are all connected together, and similarly for all other electrodes having the same identifying letter.

In this particular counter tube the electron beam is advanced circumferentially by one-tenth of a revolution for each electrical signal applied to the trigger electrode 16, so that each front collector sector corresponds to two distinct counts. The tube is so designed that the electron beam tends to occupy a stable position with approximately half the beam impinging on a front collector sector and half passing through a slot or aperture in the front electrode and falling on a sector of the back collector assembly. Upon a signal being applied to the trigger electrode the electron beam is advanced circumferentially to the next stable position, in the present tube by way of an intermediate stable position. Several of these stable positions of the electron beam have been shown by the shaded areas in Fig. 2, the numbers (1), (2), (3) denoting the stable positions occupied for counts of (1), (2) and (3) respectively, and (1½), (2½) denoting intermediate stable positions. The stable positions are those where approximately half the beam falls on a leading edge of a slot or aperture in a front collector assembly, and half passes through the slot or aperture. Accordingly, each front collector sector, for example sector A'', is slotted or apertured to provide four leading edges 24, 25, 26, 27 (Figs. 2 and 5). For reasons which will be apparent later, the front collector sectors may be called clock-wise going sectors or electrodes, and the back collector sectors counter-clockwise-going sectors or electrodes.

The manner in which the front collector sectors are assembled is best seen in Fig. 6. Each sector has a central arcuate extension 28 at one end and an internally projecting tongue 29 near the other end. The sectors are secured to two mica washers 30, 31, the parts being assembled as follows: arcuate extensions 28, mica washer 30, tongues 29, mica washer 31. The parts are wired together by wires 32 passing through openings in the extensions 28 and mica washers 30, 31 and clearing the tongues 29. The collector sectors are made of thin metal, and, as a consequence of the axial displacement of the tongues 29 with respect to the extensions 28, they flex so that the overlapping parts of the sectors are in different planes. The mica washers are assembled to the remainder of the collector assembly as a whole by the lower screw 23 of Fig. 1. Further washers are provided between the front collector assembly and the suppressor grid, and are shown at 21 in Fig. 1.

The configuration of the suppressor grid is shown in Fig. 3. It is made from thin sheet metal with apertures corresponding to but larger than the apertures and slots in the front collector sectors. Its object is to allow free passage of the electron beam, after passing through the slots and/or apertures in the front collector, to the back collector sectors while preventing secondary emission from the back collector to the front collector. It is connected to the cathode of the tube or to a point of low potential.

The back collector assembly is shown in Fig. 4. The sectors are wired or otherwise secured to annular mica washers 33, 34. The sectors overlap as shown, one edge of each sector being stepped at 35 in the direction of the cathode. Preferably each sector is apertured at positions where the electron beam will fall when in the stable position corresponding to a particular count, the apertures being in the form of a number corresponding to the count. Thus the sector A''' is provided with two apertures in the form of the numbers 1 and 2, the number 1 being placed behind the slot 35 in the front collector sector B'' (Fig. 2) and the number 2 behind the aperture 36. With this construction the top end of the envelope 5 (Fig. 1) is covered with fluorescent material. The electrons transmitted through the front collector openings form a parallel beam of small cross-section, which is made divergent by the powerful electrostatic lens formed by maintaining the suppressor grid potential at zero or some voltage lower than that of the front collector. The gap between the suppressor and the back collector allows the divergent beam to spread sufficiently to illuminate the whole area of a cut-out-number, and, continuing through the open number in straight lines, project an enlarged image of it on the fluorescent screen. It is an advantage of this method that only the small part of the beam actually used to illuminate the image is lost from the back collector system.

*Counter tube circuit*

Figure 10:
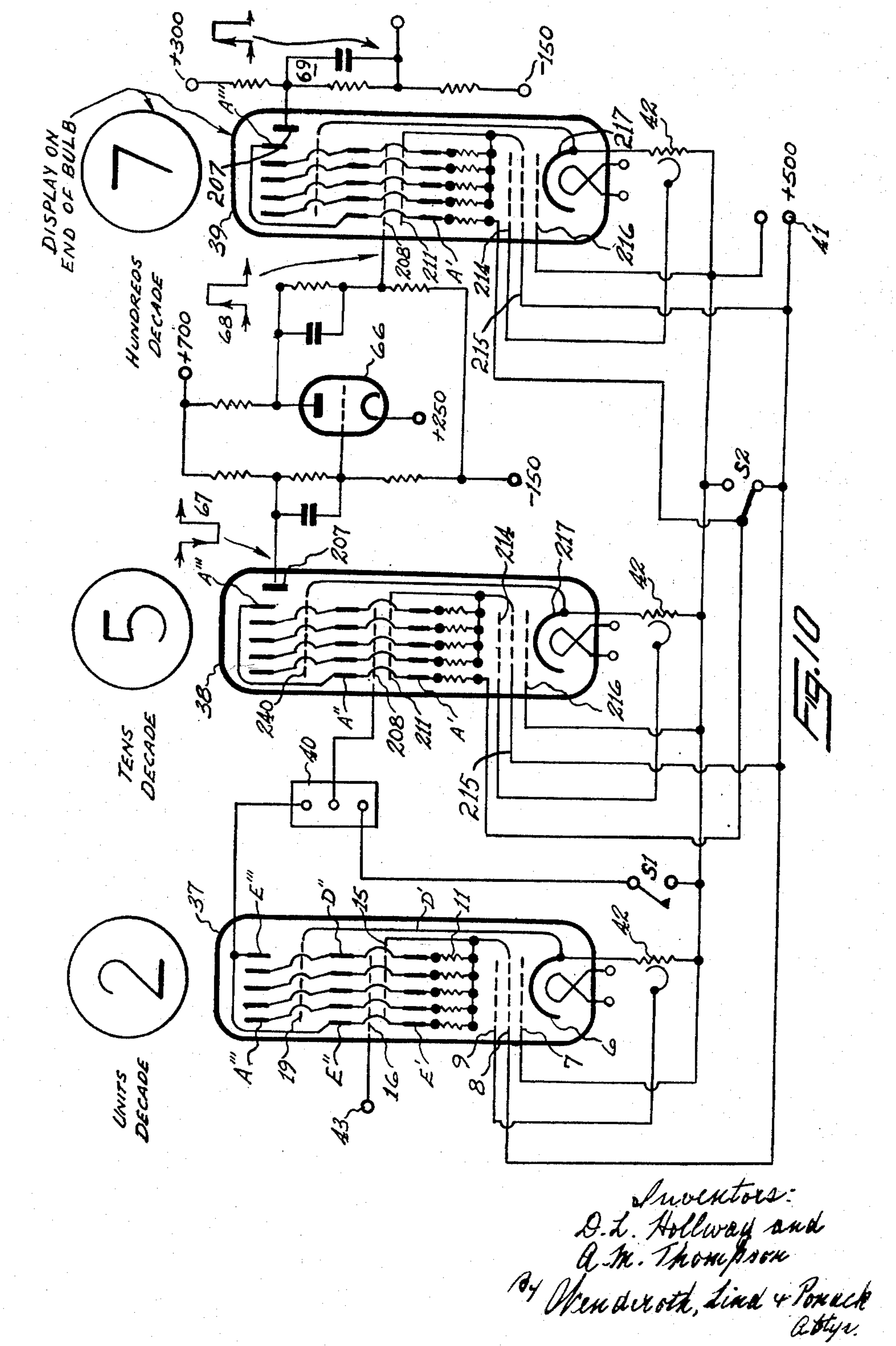
Fig. 10 is a circuit diagram showing how the counter tubes of Fig. 1 and Fig. 17 are connected in use.

A circuit employing three circular scale-of-ten counter tubes is shown in Fig. 10, which also shows alternative methods of passing on the count every ten counts from one counter tube to another. In this figure counter tube 37 is the units counter, 38 is the tens counter, and 39 is the hundreds counter. Counter tube 37 is a circular scale-of-ten tube as previously described with particular reference to Figs. 1 to 6, while tubes 38 and 39 are circular scale-of-ten tubes as will be hereinafter described with particular reference to Figs. 17 to 22, the principal difference between the two types of tubes, apart from their physical construction, lying in the fact that the tubes 38 and 39 have been provided with "carry-over" electrodes 207.

The back collector sector E''' of tube 37 is coupled to the trigger electrode 208 of tube 38 by a suitable coupling 40 such as a resistance condenser combination or a buffer vacuum tube. The anode 8 of the tube 37, and also the anodes 215 of tubes 38, 39 are connected directly to the positive terminal 41 of a high-tension direct-current source. The cathodes 6 or 217 are connected to the negative terminal of the high-tension source by way of individual cathode resistors 42, the grids 7 and 216 being connected direct to the negative terminal. The focussing rings 9 and 214 may also be connected direct to the negative terminal, but preferably are connected to sliding contacts on the resistors 42 to allow the potential applied thereto to be varied over a range. The signals to be counted are applied to the trigger electrode 16 of tube 37 by way of terminal 43.

The "carry-over" electrode 207 of tube 38 is coupled to the trigger-electrode 208 of tube 39 by a direct-coupled buffer amplifier tube 66. This coupling means may be used where the carry-over electrode is maintained at a potential above that of the surrounding positive ring 211. The amplifier tube 66 converts the negative signal 67 at the carry-over electrode 207 to a positive signal 68 for application to the trigger electrode 208 of tube 39. A resistance-capacity coupling network 69 is shown connected to the carry-over electrode 207 of tube 39 which is suitable for use where the carry-over electrode is maintained below the potential of the positive ring 211.

Tube 37 may be reset to zero by closing the switch S1, thereby to reduce the potential on the deflecting electrode E', and so deflect the beam to the count of 0. A preferred method of resetting to zero is shown in connection with tubes 38 and 39, where the leads to the load resistances connected to the A' deflecting electrodes are brought out separately to the switch S2. In the position of the switch shown the circuit is set up for counting with the switch arm connected to the high tension terminal 41. For resetting switch S2 is operated to its other position, thereby dropping the potential on electrodes A' to zero, and causing the electron beam to move to the count of 0 position. The reason why the electrode A' is dropped in potential in the case of tubes 38 and 39, whereas electrode E' is dropped in potential in the case of tube 37, is because the 0 count position is shown as falling on the A''' electrode in the case of the counter tube of Figs. 17 to 22, and on the E''' electrode in the case of the counter tube of Figs. 1 to 6.

*Operation*

Referring now to Fig. 2, assume that the electron beam is at the position (1), so that part is intercepted by front collector sector B'' and part passes through the opening 35, traverses the suppressor, and falls mostly on the back collector sector A''', and partly on back collector segment E'''. Current flows through these collector sectors, producing proportional voltage drops across the load resistances, so that the voltages on the deflecting electrodes B', A' and E' fall by amounts proportional to the beam currents to the collector sectors to which they are connected. These voltage drops produce a deflection sufficient to bring the beam out to the inside edge of the positive ring 15 (Fig. 1).

In the stable state part of the beam is intercepted by the positive ring 15 so reducing the current contributing to deflection. If the beam tends to move radially toward the axis the current available for deflection increases, the deflecting electrodes fall in potential, and the electron beam is forced outwardly again. This self-regulating process holds the magnitude of the radial deflection produced by the deflectors within close limits irrespective of large increases in the load resistances beyond the necessary minimum, and substantially eliminates beam current change disturbances. It should be noted that the beam is substantially circular in cross-section opposite the positive ring. The positive ring in effect lops off part of the beam, and subsequent focussing by the trigger electrode causes the beam to take up the shape somewhat as shown in Fig. 2.

If the beam tends to wander circumferentially clockwise, the beam current passing to back collector sectors A''' and E''' increases, and that to front collector sector B'' decreases. The potentials on deflector electrodes A' and E' therefore fall still further, whilst that on electrode B' rises.

The tendency of the beam to move in the A and E directions therefore increases, while the tendency to move in the B direction is decreased. Since the beam is held against radial movement by the positive ring 15, the resultant effect is for the beam to move anti-clockwise until the original disturbance is counteracted. Any tendency for the beam to wander counter-clockwise is corrected by the increased beam current to front collector B'' and corresponding fall in voltage of deflector electrode B'.

Briefly, a spot in position (1) (Fig. 2) is constrained by a counter-clockwise circumferential deflection contributed largely by the deflector E' voltage drop and a little by deflector A' which tends to increase as the spot moves clockwise. Also operating is a clockwise circumferential component contributed by deflector B' which would increase if the spot moved counter-clockwise. The beam is therefore locked in position with the beam split partly to E''', largely to A''' and partly to B'' and some to the positive ring 15.

Suppose the potential on the trigger ring 16 (Fig. 1) is increased. The spot moves outward along the edge 24 in the front collector sector B'' until the top of the opening 35 is reached. At the top of the opening, further movement reduces the fraction of the beam maintaining the anti-clockwise restraint, and the spot falls around clockwise to position (1½) which is stable for this and higher trigger voltages. At this point the beam current divides between front collector sector B'', back collector sector A''', and the positive ring. If now the trigger voltage falls the beam will move radially inwards along the edge 25 until the spot reaches the edge 44, at which stage the fraction of the beam current passing to back collector sector A''' falls, the anti-clockwise restraint on the beam is reduced, and the spot falls round to the stable position (2). At this position the beam current divides between front collector sector B'' and back collector sector A'''.

The difference between the trigger voltages producing these inside and outside change-overs is termed the "trigger overlap." This overlap ensures that the spot will not miss positions.

If now the trigger voltage rises again the beam will move radially outwards, the spot travelling along the edge 26 until it reaches the top of opening 36, when once again the anti-clockwise restraint is reduced. However, the spot is now nearing the B direction, and in order to increase the clockwise-going tendency, the circumference of front collector sector B'' is slotted to enable portion of the beam to fall on the extension 45 of front collector sector C''. As a consequence of the resultant decrease in the potential of deflector electrodes B', C' the spot falls clockwise to position (2½). A sufficient fall in trigger voltage then causes the spot to move radially inwards along edge 27 of sector B'', and finally to fall round to position (3). The projection 46 on sector B'' provides for an overlap of the front collector sectors B'' and C'', part of the electron beam falling on this projection and part on sector C'' when the spot moves past the bottom of slot 47. As a consequence sector B'' contributes a clockwise-going tendency, as well as sector C'', until the beam spot passes the B direction.

It will be seen, therefore, that each trigger wave which first rises above a first critical value and then falls below a lower critical value moves the beam around one tenth of the circumference, repeated signals stepping the spot around clockwise without interruption.

Because each unit of the count is associated with one particular combination of voltage drops on the deflector electrodes, any of the well known methods using neon lamps or numbered voltmeters could be used for indicating the count. However, it is preferred to indicate the count by a direct indication on a fluorescent screen at the top of the tube as previously described.

*Deflector electrode systems*

A suitable deflector electrode system has been shown pictorially in Fig. 1. In Fig. 5 the deflecting electrodes have been represented by five equal segments placed opposite to the direction of deflection produced by them.

It is necessary in practice to provide an electrostatic deflecting system which will deflect the beam in any one of five radial directions, when the potential of a particular one of the deflecting electrodes is dropped, without causing too much de-focussing of the beam upon deflection.

A simple construction which was considered consists of five straight sided plates disposed around the sides of a cylinder and each covering substantially one-fifth of the circumference. The electrodes A′, B′, C′, D′ and E′ in Fig. 5 may be regarded as a section across such an electrode system. However, such a system is unsatisfactory. The desired beam characteristics result in appreciable space charge defocussing so that, if the focussing ring is to have any appreciable effect on the final spot, the length of the tube must be reduced as far as possible. Also, from collector design considerations, the voltage drop necessary to produce full deflection must be less than ⅓ or ½ of the anode supply voltage. Because of this need for deflection sensitivity it is not possible to avoid the deflection defocussing which is characteristic of simple deflection systems such as that shown in Fig. 5 by simply increasing the ratio, deflector electrode radius/beam radius. Therefore, deflecting electrode shapes which introduce less defocussing at usable values of the above ratio have been originated.

It is found that a straight sided deflector plate construction covering 0.6 of the circumference of a cylinder would give satisfactory deflection characteristics. Obviously five such electrodes could not be used unless displaced axially, (which would introduce other complications) since they would overlap. Two constructions have been developed which give the desirable characteristics of electrodes covering 0.6 of the cylinder circumference from electrodes which in fact cover only one-fifth of the total circumferential area. In one construction the deflector plates are given a spiral form, or preferably a double spiral, with twists of 0.4 to 0.6 of one turn.

In another construction each deflector consists of pairs of deflecting plates.

Figure 11:
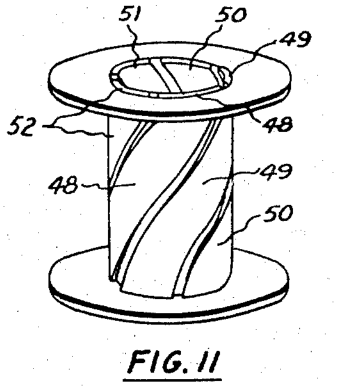
Figs. 11 and 12 are perspective sketches of spiral deflecting electrodes.

Fig. 11 shows a deflector electrode system consisting of five spiral electrodes 48, 49, 50, 51, 52 twisted about the circumference of a cylinder. Twists of 0.4 to 0.6 of one turn have been found by experiment to give satisfactory deflectors. The mid-point of the individual deflector electrodes should be placed opposite the corresponding direction of deflection. Thus the representation of the deflector electrodes in Fig. 5 may be regarded as a diagrammatic cross-section defined by a plane perpendicular to the axis of the electrode system and cutting the electrode system of Fig. 11 midway between its extremities.

Figure 12:
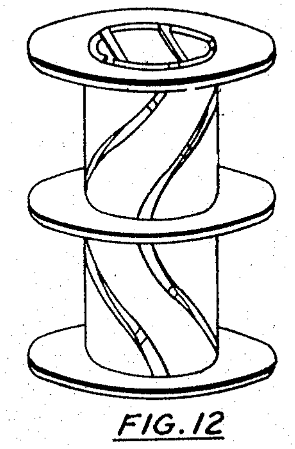

However, a double twist is preferred, and Fig. 12 shows an electrode system having such a construction. In such a system points midway between the extreme angular positions of the electrodes must be placed opposite the directions of deflection.

The electrodes of Figs. 11 and 12 may be used in a tube as shown in Fig. 1 without having conical straight sided extensions at their upper ends as shown in Fig. 1. In such a case, however, the positive ring 15 is provided with a downward cylindrical extension to near the top of the deflecting electrodes. The arrangement shown in Fig. 1, in which doubly twisted cylindrical deflecting electrodes are provided with conical extensions at their upper ends, is preferred.

Figure 15:
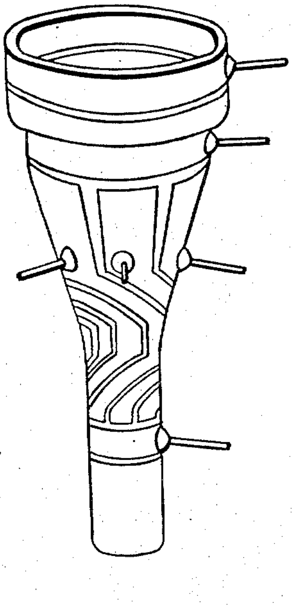
Figs. 13, 14 and 15 are sketches showing alternative deflecting electrode structures.

In the construction shown in Fig. 1, plates of nickel or other suitable metal are riveted to holes through the ceramic (or glass) shell 1. Deflector shapes having gaps cut in a metal coating on the inside surface of glass or ceramic cones have also been used, and Fig. 15 illustrates such a construction in which the focussing ring, positive ring and trigger electrode are also formed by metal coatings.

Figure 13:
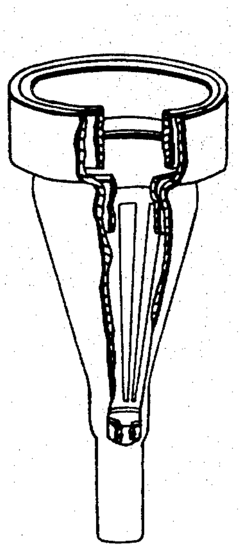

A second deflector design uses pairs of straight plates for each deflector, the plates being disposed about the surface of a cylinder or cone. Figs. 7 and 13 show such a system, in which Fig. 7 may be regarded as a diagrammatic cross-section across the conically disposed deflecting electrodes of Fig. 13. Systems of five-fold symmetry can be made from ten plates by combining pairs at intervals of 3, 5, or 7 spaces. The 10 plate spaced 3 intervals is shown in Fig. 7 and produces a reasonably uniform field across the beam with little divergence, is easy to construct, and adjacent pairs have good characteristics when used in combination. In this arrangement electrodes 53 and 60 are connected together and provide deflection in the A direction. In tabular form—

| Direction of deflection | A | B | C | D | E |
|---|---|---|---|---|---|
| Electrodes connected together | 53, 60 | 55, 62 | 57, 54 | 56, 59 | 58, 61 |

Figure 14:
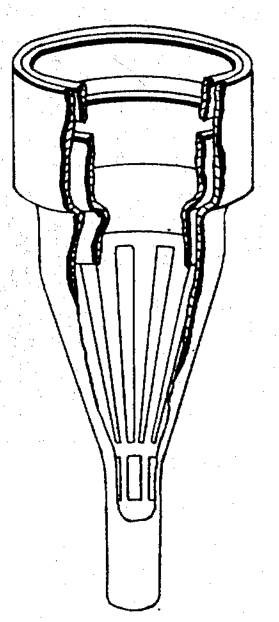

Figs. 8 and 14 show a modified construction employing a combination of ten electrodes and five electrodes for the deflecting system. Electrodes 63, 64 and 65 are connected together, as shown, and provide deflection in the A direction. The connections between the other electrodes have not been shown, but will be obvious—an electrode in the series of five opposite to a desired direction of deflection is connected to the two electrodes in the series of ten at right angles to the direction of deflection.

*Alternative front collector systems*

In the counter tube so far described, two stable positions of the electron beam are associated with each count of one. This enables arbitrary waveforms to be used for the impulses to be counted—it is only necessary that the wave amplitude rise above some critical value, and subsequently fall below a lower critical value, for each count of one.

The front collector system can be simplified if only one stable state is provided for each count of one, but in this case the impulses to be counted must have a pulse wave-form of short duration. Such a system can be provided by modifying the front collector system shown in Fig. 2 by omitting the slots such as 47, 48 extending from the circumference inwards. The pulse duration must be such that the beam clears the slot 35, but does not reach the aperture 36, before the pulse ends.

A scale-of-five tube may be made instead of the scale-of-ten using an electrode system identical with that shown in Fig. 1 but substituting for the front collector system a group of five front collector segments as in Fig. 2, but having only two open areas instead of four in each segment. Thus the slots 43 and 36 could be omitted in each segment. A scale-of-five allows larger openings and therefore larger beam currents than the scale-of-ten tube.

*Reversible counter*

By a simple modification to the front collector electrode system of Fig. 2, leaving the back collector and other electrodes shown in Fig. 1 unchanged, the tube may be made reversible. A reversible counter tube may be of greater usefulness in electronic digital computers by reason of its ability to perform the arithmetic operations of subtraction or addition, depending on the voltage region traversed by the input trigger signal. The tube would store and indicate the running algebraic sum of the signals received.

Figure 16:
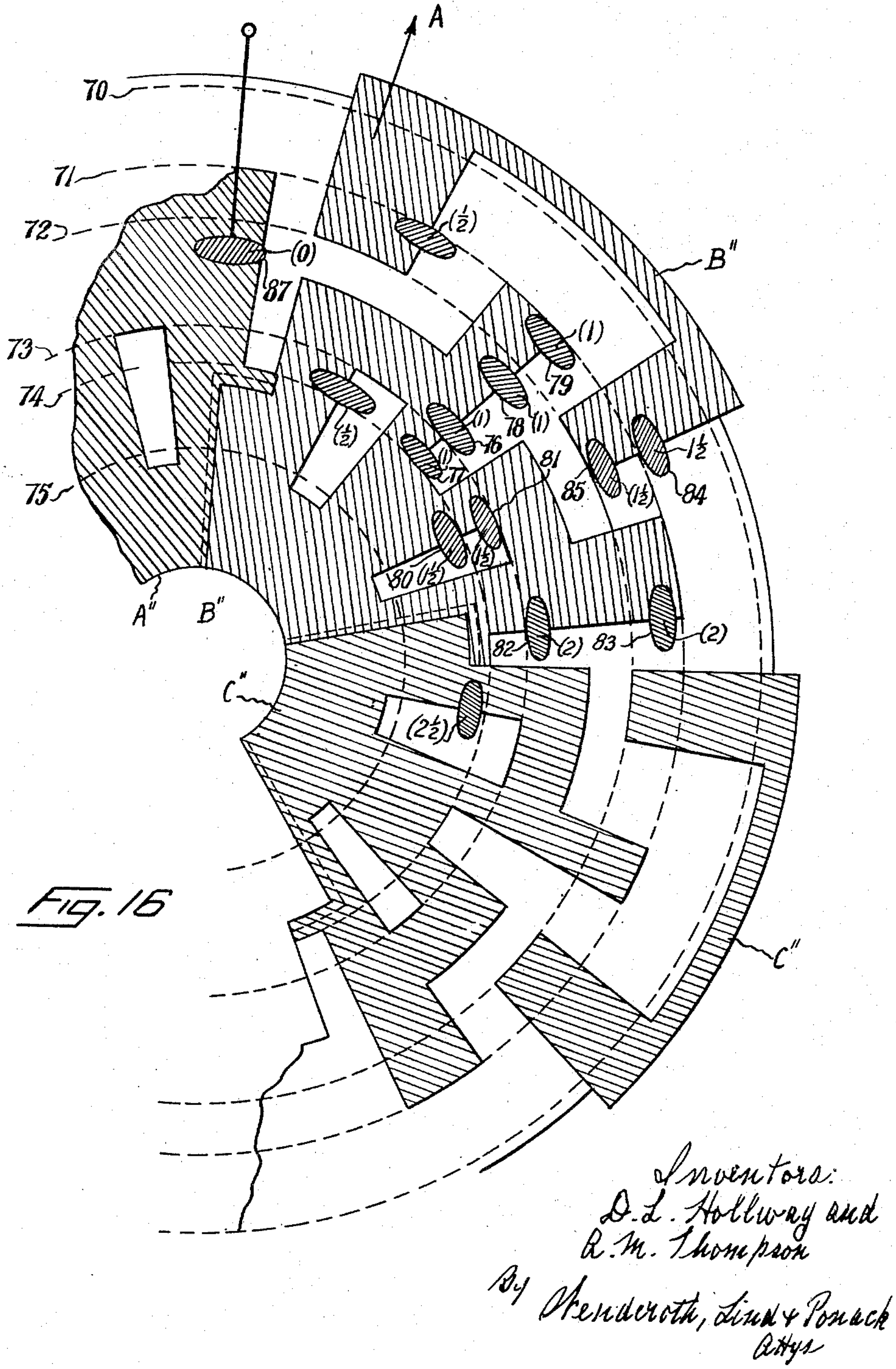
Fig. 16 shows part of a front collector system for use in a reversible scale-of-ten counter tube such as the tube of Fig. 1.

A front collector system suitable for a reversible tube is shown in part in Fig. 16, which shows two fifths of the circumference. All sectors are identical and consist of two separate parts connected together electrically. The broadly spaced hatching has been used to indicate those parts of a sector above parts of other sectors, and not to indicate sections. The narrowly spaced hatching indicates electron beam spot positions. The dotted circumferential lines indicate spot positions corresponding to different trigger potentials, 70, 71, 72, 73, 74, 75 indicating increasingly negative or less positive trigger potentials.

The count of one is identified with spot positions 76, 77, 78, 79 maintained in stability as described with reference to Fig. 2. No change in count is observed for excursions of the trigger potential between 72 and 73 in position (1). If the trigger potential reaches 74, however, the spot will move onto a clock-wise-going plate B'' and jump to 80 on the (1½) edge subsequently passing to 81 and then over to 82 upon a rise of trigger potential to 73, indicating a count of two.

However, if the trigger potential now rises, the spot moves along the edge of the sector B'' to the position 83, and when its potential rises above that indicated by 71 the spot moves off the front collector sector B'' and falls largely on the back collector sector A''' (see Figs. 4 and 5). Accordingly, the beam jumps anti-clockwise to the outer intermediate position 84 corresponding to a count of (1½). No further circumferential movement of the beam takes place until the trigger potential falls below the level indicated by 72, when the spot, passing through position 85, falls largely again on the counter-clockwise-going back collector sector A''', and the beam jumps to the position 78 indicating a count of one. By this process upwards voltage waves reduce the count (subtract) progressively; downwards waves increase it (add).

In an alternative construction a second trigger may be added at the central axis of the front collector plane so that a negative going wave applied to it displaces the beam outwardly and so subtracts from the count. Negative going signals applied simultaneously to this second trigger and to the trigger 16 of Fig. 1 would produce no spot displacement or change in the stored count while maintaining full electrical independence between these two electrodes. Alternatively, trigger 16 may be split into a number of independent rings each capable of increasing or reducing the count, but electrically substantially independent of each other.

*Alternative counter tube with circular beam movement general assembly*

Figure 17:
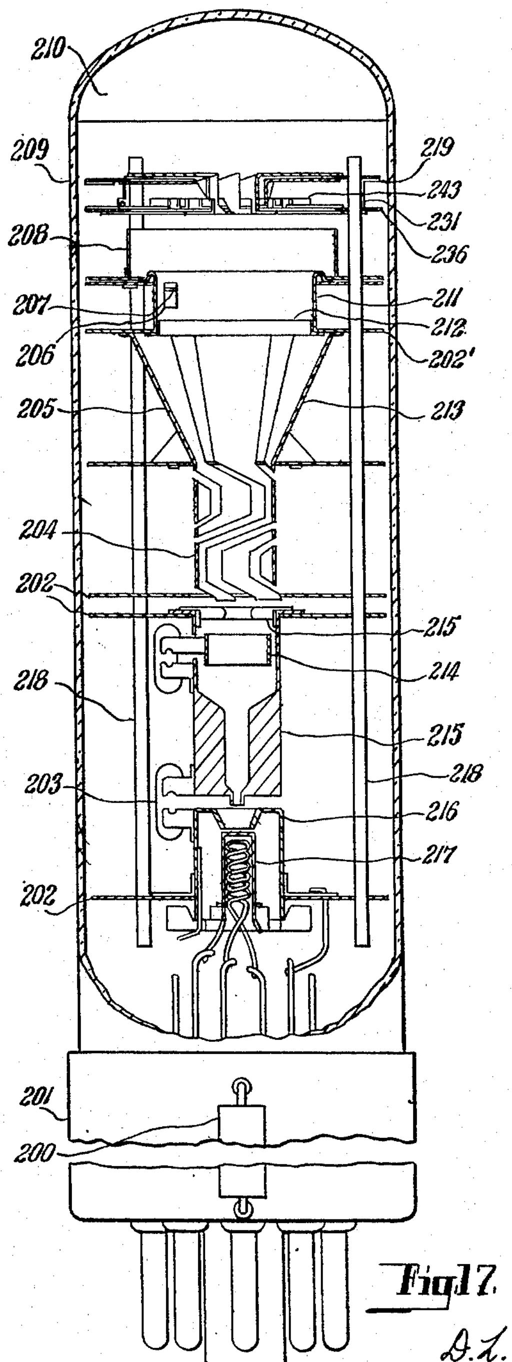
Fig. 17 is a sectional elevation, somewhat diagrammatic, showing the general assembly of an alternative construction of a scale-of-ten electronic counter tube.

An alternative and at present preferred form of construction of a circular scale-of-ten counter tube is shown somewhat diagrammatically in part-section in Fig. 17. The electron gun and deflector system is generally similar to that employed in the counter tube of Fig. 1, but the mechanical assembly of the electrodes has been altered and simplified. The counter tube is mounted on a conventional base 201. The five resistors corresponding to those numbered 11 in Fig. 1 are mounted externally of the counter tube proper on this base, one of them only being shown in Fig. 17 and 200. These resistances could equally well be mounted inside the envelope 209 of the counter tube if desired.

The various electrodes are secured to mica rings 202 supported on five straight metal rods 218, glass beads 203 also being used to connect mechanically certain electrodes and thereby give greater rigidity to the structure. The electron gun assembly comprises the anode 215, made in two parts, grid 216, and indirectly heated cathode 217, generally similar to that employed in the counter tube of Fig. 1. The five deflector electrodes are shown at 204, 205 and consist of triply twisted cylindrical portions 204 connected to conical extensions 205. A focussing ring is shown at 214, and a positive ring at 211, a flanged ring 212 being used to secure the positive ring to the mica washer 202'. A window 206 is provided in the positive ring 211 in which is positioned a "carry-over" electrode 207 insulated from the ring. The window 206 is positioned in the part of the ring 211 where the electron beam falls when the electron spot reaches the 9½ count position on the electron collector plates, so that part of the beam is intercepted by the carry-over electrode 207 during the change-over between 9 and 0 counts but not at other counts.

The trigger electrode is shown at 208. As previously stated the electrode assembly thus far described is similar to that of the counter tube of Fig. 1, differing mainly in the way in which the electrodes are supported, and in the provision of the carry-over electrode 207. Obviously a carry-over electrode could also be provided in the counter-tube of Fig. 1. The collector electrode assembly is shown at 219, and will be described in more detail with reference to Figs. 18 to 22, but comprises a front collector electrode system nearest the electron gun, suppressor grid, and a back collector electrode system. This collector electrode assembly serves the same functions as the collector electrode asesmbly 17 of Fig. 1, and comprises the same elements, but differs in the manner of assembly, and in the detailed shape of the sectoral electrodes. In particular corresponding front and back collector electrodes are formed from a single blank shown in Fig. 21, suitably folded and secured to mica washers to form a box-like structure. The back collector sectors may be apertured with the numbers 0 to 9 corresponding to different counts, as is best seen in Fig. 18, and the envelope 209 may be coated with fluorescent material 210 at its end in order to produce a visual image of the count number corresponding to the position of the electron beam.

*Collector assembly*

Figure 19:
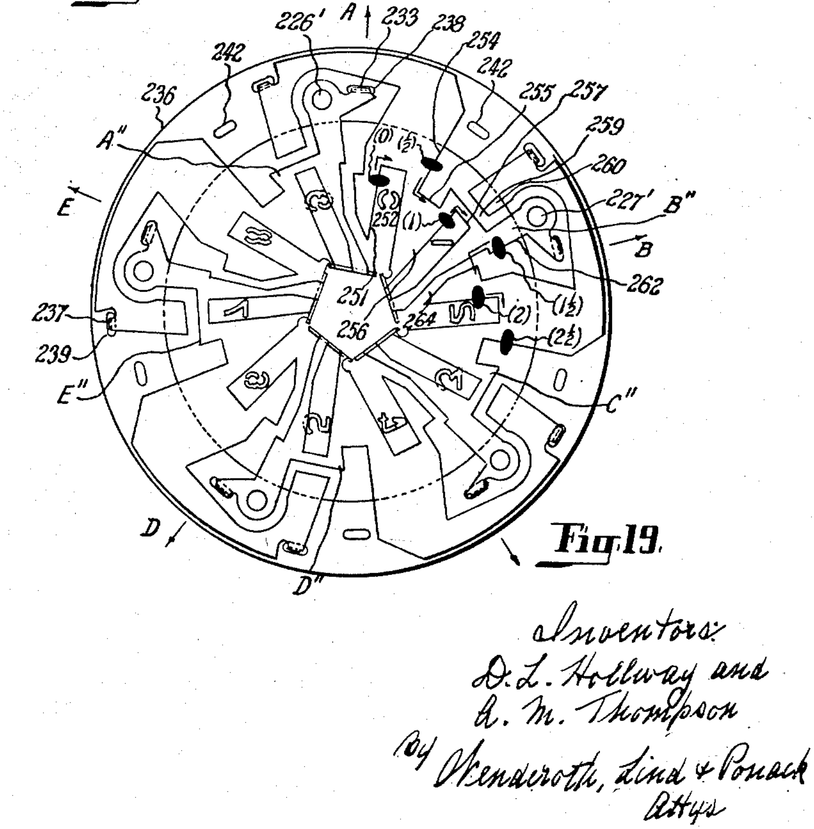
Fig. 19 is a plan view of the collector electrode system used in the counter tube of Fig. 17 from the front, that is, looking in the direction of the electron beam.
Figure 20:
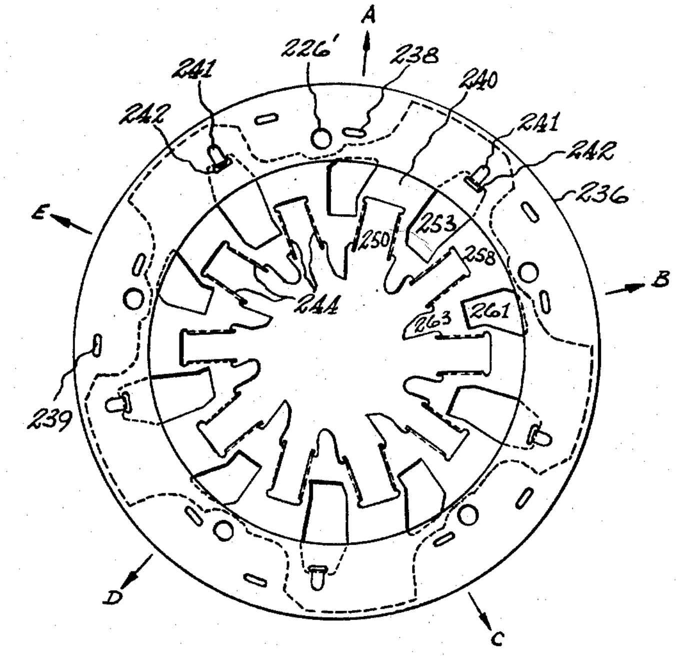
Fig. 20 is a plan view of the suppressor grid used in the counter tube of Fig. 17 also taken looking in the direction of the electron beam.
Figure 21:
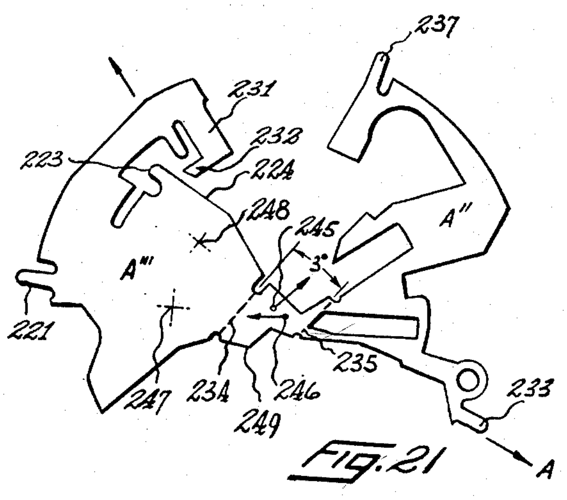
Fig. 21 is a plan view of a blank which is folded to provide corresponding front and back electrodes.
Figure 22:
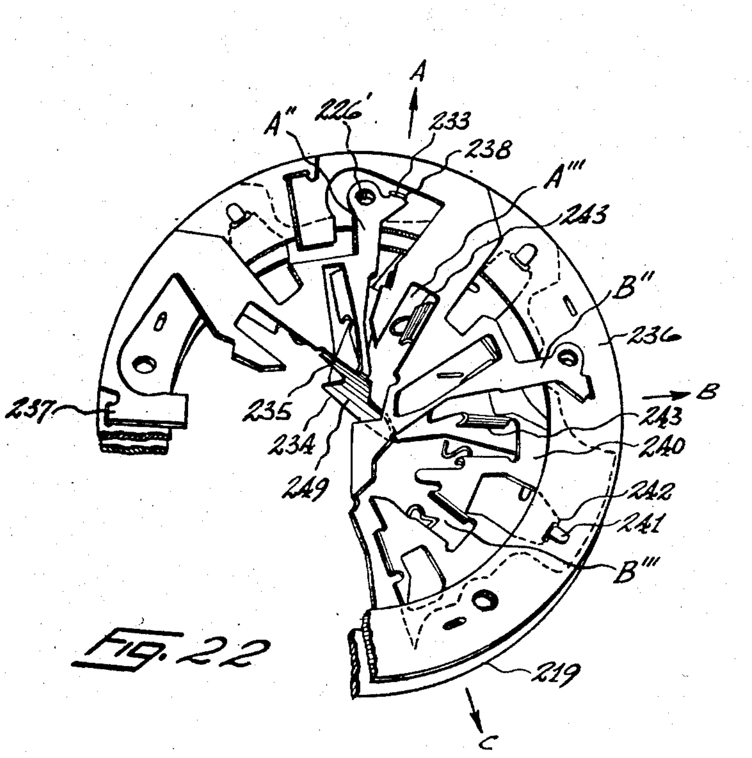
Fig. 22 is a perspective view of a collector assembly, partly broken away, to show details, and showing only two front and back collector-electrodes.

Reference will now be made more particularly to Figs. 20 to 22 in describing the collector assembly. As in the case of the counter tube described with reference to Figs. 1 to 9, the letters A, B, C, D, and E denote different directions in which the electron beam is deflected when a particular one of the deflecting electrodes has its potential dropped. The letters appear in counter-clockwise order in Fig. 18, whereas they appear in clockwise order in Figs. 19 and 20, because the assembly is being viewed in a direction opposite to that of the electron beam in Fig. 18, but in the direction of the electron beam in Figs. 19 and 20.

Figure 18:
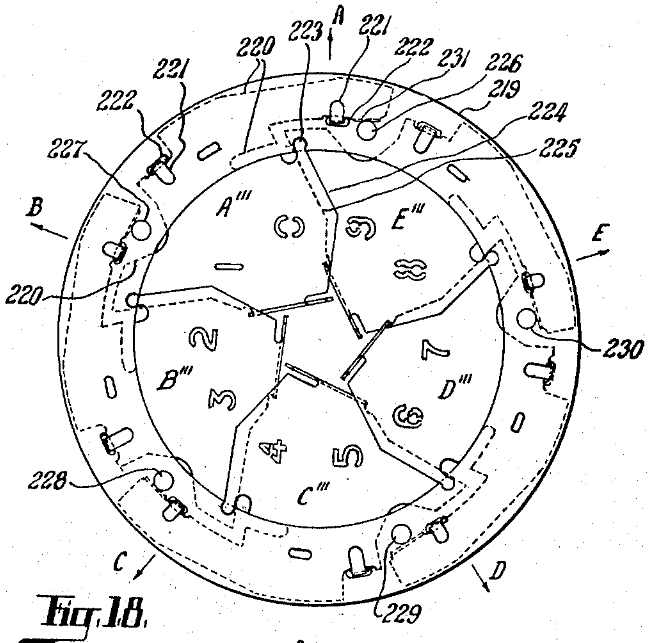
Fig. 18 is a plan view of the collector electrode system used in the counter tube of Fig. 17 showing details of the back collector electrode system.

Fig. 18 is a plan view of the collector assembly showing only the back collector sectors. As previously the letters A''', B''', C''', D''', E''' denote those back collector sectors which are connected to the deflector electrodes which produce respectively electron beam deflections in the A, B, C, D and E directions, and may be called counter-clockwise-going sectors or electrodes. The back collector sectors overlap along their edges, and to allow this to be done while having the overlapping parts spaced from each other portion of each sector is behind an annular mica ring 219 and portion above it (see also Fig. 22). Thus in the case of the back collector sector A''' the portion shown dotted and numbered 220 is behind the mica ring 219, being secured to it by lugs 221 extending through slots 222 which are bent over as shown. The lug 223, on the other hand, rests on the upper surface, as viewed in this figure, of the mica ring, so that the edge 224 of the sector A''' lies above, that is, further from the front collector electrodes, than the edge 225 of the adjacent sector E'''. 226, 227, 228, 229, 230 are openings in the mica ring for the support rods 218 (Fig. 17) which also constitute means for applying potentials to the electrode systems to which they are connected. Thus the support rod disposed in opening 226 is welded to the sector A''' by the bent down portion 231 (see also Fig. 1), a lug 232 on which is also welded, after assembly, to a lug 233 on the front collector sector A'' (see Fig. 21). The tilt out of the plane of the mica ring given to the sector A''' (and likewise to the other back collector sectors), is assisted by selecting the lines of folding 234, 235 of the blank from which the front and back collector sectors A'', A''' are made so that they make a small angle of approximately 3° with each other as shown in Fig. 21.

The front collector sectors in the present embodiment all lie in the same plane and are denoted, as previously, by the letters A'', B'', C'', D'', E''. A plan view of the front collector sector assembly is given in Fig. 19, two sectors of which are also shown in Fig. 22. The suppressor grid and back collector sectors are not shown in Fig. 19, although the count numbers 0 to 9, which are cut-out of the back collector sectors, have been shown in their correct relative position with respect to the front collector sectors in order to assist in a proper understanding of this invention being obtained. The front collector sectors are all identical in shape, as are also the back collector sectors. The front collector sectors are secured to one side of an annular mica ring 236, the side nearest the electron gun, by lugs 233, 237 passing through slots 238, 239 in the mica ring. As previously stated the lug 233, after being bent and passed through slot 238, is welded to lug 232 on the back collector sector A'''. Lug 237, after being passed through the slot 239, is bent over the mica. Openings 226', 227' . . . correspond with the openings 226, 227 . . . in the mica ring 219 (Fig. 18).

The suppressor grid 240 is secured to the side of the mica ring 236 opposite to that to which the front collector sectors are secured, and a plan view of the suppressor grid fixed to the mica ring by lugs 241 passing through slots 242 is shown in Fig. 20. Portions 243 of the edges 244 of the suppressor grid are bent back in the direction of travel of the electron beam (see also Figs. 17 and 22).

A blank from which the front and back collector sectors A'', A''' are formed by folding along the lines 234, 235 is shown in Fig. 21. The centre of the arcs of the front collector sector A'' is shown at 245, and the centre of the arcs of the back collector sector at 246. The centres of the cut-out count numbers are shown at 247, 248. The remaining front and back collector sectors are folded from similar blanks. The portion 249 joins corresponding front and back collector sectors electrically and, with the portion 231 and lugs 232, 233, forms a mechanically strong box-like structure.

*Operation*

The operation of the counter tube shown in Figs. 17 to 22 is similar to that of the counter tube of Figs. 1 to 6, but the positions of the count numbers have been altered, the positions of the even number counts in the embodiments of Figs. 17 to 22 corresponding to the odd number counts of the embodiment of Figs. 1 to 6. Thus the count of (0) position of the electron beam in the embodiment of Figs. 17 to 22 corresponds to the count of (1) position of the embodiment of Figs. 1 to 6. The counter tube shown in Figs. 17 to 22 is also one having two stable positions for each count of one, so that trigger wave-forms other than of pulse-form may be used, the trigger wave-form merely having to be one which first rises above a first critical value and then falls below a lower critical value for each count of one. Each trigger wave, as previously, causes the beam to move around one-tenth of the circumference of the electrode system, repeated signals stepping the spot around clockwise. Some of the approximate positions on the front collector system occupied by the electron beam in its stable states are shown in Fig. 19 by the black ovals, numbered according to the corresponding count, the number (½) indicating a stable state intermediate between a whole-numbered count. The arrows attached to the black ovals shows the approximate direction of movement of the electron spot.

Suppose the electron beam is in a position corresponding to the position (0) in Fig. 19. Approximately half of the beam falls on the front collector sector B'', causing a drop in potential of the deflector electrode B', and approximately half passes through the suppressor grid opening 250 and falls on the back collector sector A''', causing a drop in potential of the deflector electrode A'. The clockwise-going effect of the drop in potential of deflector electrode B' is balanced by the anti-clockwise-going effect of the drop in potential of deflector electrode A', and the spot remains in the stable position indicated by (0).

Suppose now the potential on the trigger ring 208 (Fig. 17) increases. The electron spot moves radially outward along the edge 251 in the front collector sector B'' until the top of the opening 252 is reached. At the top of the opening, further movement reduces the fraction of the beam maintaining the anti-clockwise restraint, and the spot falls round clockwise to position (½) which is stable for this and higher trigger voltages. At this point the beam current divides between front collector sector B'', the positive ring, and, for that portion which passes through opening 253 in the suppressor grid, back collector sector A'''. If now the trigger voltage falls the beam will move radially inwards along the edge 254 until the spot reaches the edge 255, at which stage the fraction of the beam current passing to back collector sector A''' falls, the anti-clockwise restraint on the beam is reduced, and the spot falls round to the stable position (1). At this position the beam current again divides between front collector sector B'' and back collector sector A''', and a count of one has been completed.

If now the trigger voltage rises again the beam will move radially outwards, the spot travelling along the edge 256 until the edge 257 is reached. Further outward radial movement reduces the fraction of the beam falling on the back collector sector A''', and thus the anti-clockwise restraint, and the spot falls round to position (1½). It should be noted that the part 258 of the suppressor grid falls behind the opening 259 and prevents the electron beam from falling onto the back collector sectors. In order to increase the clockwise-going tendency the part 260 of the front collector segment C'' is provided, which picks up secondary electrons, and if the beam comes out far enough picks up primary electrons from the beam, causing a drop in the potential of deflector electrode C'. This drop in potential of C' aids that of electrode B'. In the (1½) position part of the electron beam falls through the opening 261 in the suppressor grid.

If the potential of the trigger now falls the electron spot moves along the edge 262 until the bottom of the opening 261 in the suppressor grid is reached, when the electron beam is cut off from the back collector electrode A''', the anti-clockwise restraint is removed and the beam falls clockwise to spot position (2). It should be noted that portion 263 of the suppressor grid obscures the opening 264 between the front collector sectors B'' and C''. This completes the advance of the electron beam for a count of (2). The beam steps round similarly for each additional trigger wave until the (9) count position is reached. The next trigger wave causes the electron beam to pass the carry-over electrode 207, causing its potential to rise, so that a pulse-like potential wave is applied to the trigger electrode of a similar count tube provided to count tens.

We claim:

1. An electronic vacuum tube counter comprising means for generating an electron beam, at least three deflecting electrodes arranged substantially around the circumference of a cylinder, a first set of electron-collecting electrodes disposed substantially in the same plane and equal in number to the number of deflecting electrodes, each electron-collecting electrode of this first set being apertured and slotted and approximately of sector shape, a second set of electron-collecting electrodes behind the first set disposed substantially in the same plane and equal in number to the number of deflecting electrodes, each electron-collecting electrode of this second set being approximately of sector-shape, connections between each deflecting electrode, corresponding electron-collecting electrodes of the first set, and corresponding electron-collecting electrodes of the second set which are in space-phase relationship to the corresponding electrodes of the first set, resistances between the anode supply and each deflecting electrode, a ring-shaped electrode between the deflecting electrodes and electron-collecting electrodes for stabilizing the electron beam radially and a triggering electrode for moving the electron beam radially in response to a counting signal so that substantially all the beam falls on electrodes of one of said sets only.

2. An electronic vacuum tube count-of-ten counter having two stable states for each count of one comprising means for generating an electron beam, five deflecting electrodes arranged substantially around the circumference of a cylinder, five similar apertured and slotted electron-collecting electrodes disposed substantially in the same plane and forming a first set of electron-collecting electrodes, the slots and apertures having substantially radially extending edges, five similar electron-collecting electrodes disposed substantially in the same plane behind the said first set and forming a second set of electron-collecting electrodes, each electrode of the second set being positioned substantially behind an electrode of the first set, and the centres of each deflecting electrode being substantially opposite junctions of adjacent electrodes of the second set, connections between the deflecting electrodes and collecting electrodes such that a deflecting electrode is connected to an electrode of the first set which is to one side of the point immediately opposite the centre of the deflecting electrode and to an electrode of the second set which is to the other side of said point, independent resistances connected between the anode supply and each deflecting electrode, a positive ring electrode between the deflecting electrodes and the collecting electrodes for stabilizing the electron beam radially and a triggering electrode for moving the electron beam radially in response to a signal to be counted.

3. An electronic vacuum tube counter comprising means for generating an electron beam, a set of deflecting electrodes arranged substantially around the circumference of a cylinder, a first set of collecting electrodes for the electron beam, the number of collecting electrodes being equal in number to the number of deflecting electrodes, each collecting electrode being approximately of sector shape, apertures in the collecting electrodes, a second set of collecting electrodes for the electron beam positioned behind the first set and equal in number to the number of deflecting electrodes, connections between an electron-collecting electrode of the first set and an electron-collecting electrode of the second set which, when the electrodes are viewed in plan, is immediately adjacent the said electron-collecting electrode of the first set, and also to the deflecting electrode which, when the electrodes are viewed in plan, has its centre opposite the boundary between the said connected collecting electrodes of the first and second sets and is on the opposite side of the axis of the tube to the said connected collecting electrodes, similar connections between each of the other deflecting electrodes and corresponding collecting electrodes of the first and second sets, resistances connected between each deflecting electrode and the anode supply, whereby when the electron beam falls partly on an electrode of the first set and partly through an aperture onto an electrode of the second set the resulting voltage drops on the deflecting electrodes connected thereto hold the electron beam on the edge of the aperture, a ring-shaped electrode between the deflecting electrodes and the electron-collecting electrodes connected to a positive voltage source, and a ring-shaped triggering electrode between the said first-mentioned ring-shaped electrode and the collecting electrodes.

4. An electronic vacuum tube counter comprising means for generating an electron beam, five deflecting electrodes arranged substantially around the circumference of a cylinder, a first set of five approximately sector-shaped electron-collecting electrodes arranged substantially in the same plane with the edges of adjacent electron-collecting electrodes, when viewed in plan, lying substantially opposite the centre of a deflecting electrode on the opposite side of the axis of the electrode system, each electron-collecting electrode being apertured and slotted, a second set of five approximately sector-shaped electron-collecting electrodes disposed substantially in the same plane and behind the said first set with the edges of adjacent electrodes, when viewed in plan, lying substantially opposite the centre of a deflecting electrode on the opposite side of the axis of the electrode system, connections between a deflecting electrode and an electrode of the first set of electron-collecting electrodes lying adjacent to and on one side of radial line from the axis of the electrode system pointing away from the centre of the deflecting electrode, and also to an electrode of the second set lying adjacent to and on the other side of said radial line, similar connections between the other deflecting electrodes and corresponding electron-collecting electrodes of the first and second sets, resistances connected between the deflecting electrodes and the anode supply whereby impingement of the electron beam on an electron-collecting electrode causes the potential of the deflecting electrode connected thereto to fall, a ring-shaped electrode between the deflecting electrodes and the electron-collecting electrodes connected to a positive potential source, and a ring-shaped triggering electrode between the said first-mentioned ring-shaped electrode and the electron-collecting electrodes.

5. An electronic vacuum tube scale of five counter having two stable states for each count of one and wherein the electron beam steps in a closed approximately circular path during counting comprising means for generating an electron beam, five deflecting electrodes arranged substantially around the circumference of a cylinder, resistances connected between each deflecting electrode and the anode supply, a first set of five approximately sector-shaped electron-collecting electrodes arranged substantially in a plane at right angles to the axis of the deflecting electrodes, a slot in each collecting electrode which does not extend to the circumference of the electrode, cut-away radial edges to each collecting electrode whereby a slot is provided between adjacent edges of the collecting electrodes, a second set of five approximately sector-shaped electron-collecting electrodes positioned behind and in a plane parallel to the plane of the said first set, connections between each electron-collecting electrode of the first set and a corresponding electron-collecting electrode of the second set adjacent to and to one side of the collecting electrode of the first set when viewed in plan, and also to the deflecting electrode whose centre is directly opposite the connected electron-collecting electrodes, a ring-shaped electrode between the deflecting electrodes and the electron-collecting electrodes, a connection from the ring-shaped electrode to the anode supply, and a cylindrical triggering electrode between the ring-shaped electrode and the electron-collecting electrodes.

6. An electronic vacuum tube scale of ten counter wherein the electron beam steps in a closed approximately circular path during counting comprising means for generating an electron beam, five deflecting electrodes positioned substantially around the circumference of a cylinder, resistances connected between each deflecting electrode and the anode supply, a first set of five approximately sector-shaped electron-collecting electrodes positioned substantially in a plane at right angles to the axis of the deflecting electrodes, two slots in each electron-collecting electrode which do not extend to the circumference of the electrode, a second set of five approximately sector-shaped electron-collecting electrodes each positioned behind a collecting electrode of the first set, the said second set being positioned substantially in a plane parallel to the plane of the first set, connections between each electron-collecting electrode of the first set and a corresponding electron-collecting electrode of the second set displaced by one fifth of a circle, when viewed in plan, from the electrode of the first set, and also to the deflecting electrode whose centre is positioned opposite the connected electron-collecting electrodes, a ring-shaped electrode between the deflecting electrodes and the electron-collecting electrodes connected to the anode supply, and a cylindrical triggering electrode between the ring-shaped electrode and the electron-collecting electrodes.

7. An electronic vacuum tube scale of ten counter having two stable states for each count of one wherein the electron beam steps in a closed approximately circular path during counting comprising means for generating an electron beam, five deflecting electrodes positioned substantially around the circumference of a cylinder, resistances connected between each deflecting electrode and the anode supply, a first set of five approximately sector-shaped electron-collecting electrodes positioned in a plane substantially at right angles to the axis of the deflecting electrodes, each sector extending over an angle slightly greater than one fifth of 360°, and having a circumferentially extending portion at one edge thereof, a first slot near said one edge extending from the circumference toward the centre, a second slot extending from the centre toward the circumference, a third slot extending from the circumference toward the centre, a fourth slot or aperture which does not extend to the circumference, a cut-away portion above the fourth slot or aperture, the electrodes being positioned with the leading edge of the first slot of one electrode behind the leading edge of the radial edge of an adjacent electrode, and the said circumferentially extending portion of said one electrode behind the said cut-away portion in the adjacent electrode, a second set of five approximately sector-shaped electron-collecting electrodes each positioned behind a collecting electrode of the first set, the said second set being positioned substantially in a plane parallel to the plane of the first set, connections between each electron-collecting electrode of the first set and a corresponding electrode of the second set displaced by approximately one fifth of a circle, when viewed in plan, from the electrode of the first set, and also to the deflecting electrode whose centre is opposite the adjacent edges of the connected electron-collecting electrodes, a ring-shaped electrode between the deflecting electrodes and the electron-collecting electrodes connected to the anode supply, and a cylindrical triggering electrode between the ring-shaped electrode and the electron-collecting electrodes.

8. An electronic vacuum tube counter wherein the electron beam steps in a closed approximately circular path during counting comprising means for generating an electron beam, at least three deflecting electrodes arranged substantially around the circumference of a cylinder, resistances connected between each deflecting electrode and the anode supply source, a set of clockwise going electron-collecting electrodes equal in number to the number of deflecting electrodes and positioned substantially in a plane at right angles to the axis of the tube, each electron-collecting electrode being approximately sector-shaped and apertured, a set of anti-clockwise going electron-collecting electrodes equal in number to the number of deflecting electrodes and arranged behind and substantially in a plane parallel to the plane of the clockwise-going electron-collecting electrodes, each anti-clockwise going electrode being approximately sector-shaped and arranged behind a clock-wise going collecting electrode, connections between each clockwise-going electron-collecting electrode and the anti-clockwise going electrode adjacent thereto and displaced in the clockwise direction, and to the deflecting electrode opposite to the connected electrodes, a ring-shaped electrode between the deflecting electrodes and the electron-collecting electrodes which is connected to a positive potential source, and a ring-shaped triggering electrode between the said first-mentioned ring-shaped electrode and the collecting electrodes.

9. Apparatus for counting electric signals comprising means to form an electron beam, a collector assembly including a plurality of slotted and apertured front collector electrodes positioned in approximately the same plane, a plurality of back collector electrodes equal in number to the number of front collector electrodes and positioned in approximately the same plane behind the front collector electrodes, a plurality of beam deflecting electrodes positioned substantially around the circumference of a circle and equal in number to the number of front collecting electrodes, connections between each one of the deflecting electrodes and separate front and back collecting electrodes whose adjacent edges are approximately opposite the deflecting electrodes, separate resistances between each deflecting electrode and a high tension source, a ring-shaped electrode connected to a high tension source and positioned between the deflecting electrodes and the collector assembly, and a triggering electrode to which electric signals can be applied positioned before the collector assembly.

10. An electronic vacuum tube scale of ten counter having two stable states for each count of one wherein the electron beam steps in a toothed circular path during counting comprising means for generating an electron beam, five deflecting electrodes positioned substantially around the circumference of a cylinder, resistances connected between each deflecting electrode and the anode supply, a first set of five approximately sector-shaped electron-collecting electrodes positioned in a plane at right angles to the axis of the deflecting electrodes, each electrode extending over approximately one fifth of a circle, three apertures in each sector which form interlocking teeth, a cut away portion in each sector above the aperture near the leading edge of the sector, a tooth extending into each said cut-away portion which is connected to the next adjacent collecting electrode in the direction of count, adjacent approximately radial edges of each electrode being positioned to provide a gap between them, a second set of five approximately sector-shaped electron-collecting electrodes each positioned behind a collecting electrode of the first set, the second set being positioned in a plane substantially parallel to the plane of the first set, connections between each electron-collecting electrode of the first set and a corresponding electrode of the second set displaced by approximately one-fifth of a circle, when viewed in plan, from the electrode of the first set, and also to the deflecting electrode whose centre is opposite the adjacent edges of the connected electron-collecting electrodes, a ring-shaped electrode between the deflecting electrodes and the electron-collecting electrodes connected to the anode supply, and a triggering electrode.

11. An electronic vacuum tube counter comprising means for generating an electron beam, at least three deflecting electrodes arranged substantially around the circumference of a cylinder, a first set of electron-collecting electrodes disposed substantially in the same plane and equal in number to the number of deflecting electrodes, each electron-collecting electrode of this first set being apertured and slotted and approximately of sector shape, a second set of electron-collecting electrodes behind the first set disposed substantially in the same plane and equal in number to the number of deflecting electrodes, each electron-collecting electrode of this second set being approximately of sector-shape, connections between each deflecting electrode, corresponding electron-collecting electrodes of the first set, and corresponding electron-collecting electrodes of the second set which are in space-phase relationship to the corresponding electrodes of the first set, resistances connected between the anode supply and each deflecting electrode, a ring-shaped electrode between the deflecting electrodes and said first set of electron-collecting electrodes, a connection between the said ring-shaped electrode and the anode supply, and a cylindrical triggering electrode between the said ring-shaped electrode and the said first set of electron-collecting electrodes.

12. An electronic vacuum tube counter wherein the electron beam steps in a toothed circular path across electron-collecting electrodes comprising five deflecting electrodes arranged substantially around the circumference of a cylinder and being twisted to occupy about 0.4 to 0.6 of a turn around such cylinder, a set of five apertured and slotted electron-collecting electrodes, each electron-collecting electrode being approximately of sector shape, a second set of five approximately sector-shaped electron-collecting electrodes positioned immediately behind electrodes of the set of apertured and slotted electron-collecting electrodes, connections between electrodes of the apertured and slotted electron-collecting electrodes and electrodes of the second set of electron-collecting electrodes which are adjacent in the direction of count when viewed in plan, connections between each pair of connected electron-collecting electrodes and the deflecting electrode whose centre is opposite the adjacent edges of the connected electron-collecting electrodes, individual resistances connected between each deflecting electrode and the high tension source, a positive ring between the deflecting electrodes and the electron-collecting electrodes, and a radially deflecting triggering electrode.

13. An electronic vacuum tube counter wherein the electron beam steps in a toothed circular path across electron-collecting electrodes comprising five deflecting electrodes arranged substantially around the circumference of a cylinder, each deflecting electrode being twisted to occupy about 0.4 to 0.6 of a turn around the cylinder, part-conical extensions to the top ends of the deflecting electrodes, a set of five apertured and slotted electron-collecting electrodes each electron-collecting electrode being of approximately sector shape, a second set of five approximately sector-shaped electron-collecting electrodes positioned immediately behind electrodes of the set of apertured and slotted electron-collecting electrodes, connections in pairs between electrodes of the apertured and slotted electron-collecting electrodes and electrodes of the second set of electron-collecting electrodes which are adjacent in the direction of count when viewed in plan, connections between each pair of connected electron-collecting electrodes and the deflecting electrode whose centre is opposite the adjacent edges of the connected electron-collecting electrodes, individual resistances connected between each deflecting electrode and the high tension source, a positive ring between the deflecting electrodes and the electron-collecting electrodes, and a radially deflecting triggering electrode.

14. An electronic vacuum tube counter wherein the electron beam steps in a toothed circular path across electron-collecting electrodes comprising a plurality of deflecting electrodes arranged substantially around the circumference of a cylinder, a set of apertured and slotted electron-collecting electrodes equal in number to the number of deflecting electrodes, each electron-collecting electrode being approximately of sector-shape, a second set of approximately sector-shaped electron-collecting electrodes also equal in number to the number of deflecting electrodes positioned behind electrodes of the set of apertured and slotted electron-collecting electrodes, the electrodes of the second set being apertured with count numbers at the positions of the electron beam corresponding to the count numbers, a fluorescent screen behind the second set of electron-collecting electrodes, means for projecting enlarged images of the count numbers on the fluorescent screen comprising an apertured suppressor grid between the two sets of electron-collecting electrodes connected to a potential which is low compared to those of the electron-collecting electrodes to thereby diverge the electron beam rapidly, connections between pairs of the electrodes of the apertured and slotted electron-collecting electrodes and electrodes of the second set of electron-collecting electrodes which are adjacent when viewed in plan, connections between each pair of connected electron-collecting electrodes and the deflecting electrode whose centre is opposite the adjacent edges of the connected electron-collecting electrodes, individual resistances between each deflecting electrode and the high tension source, a positive ring between the deflecting electrodes and the electron-collecting electrodes, and a radially deflecting triggering electrode.

15. In an electronic vacuum tube counter including means for forming a beam of electrons and wherein the electron beam is stepped along a toothed circular path during counting, a plurality of deflecting electrodes positioned substantially around the circumference of a cylinder for determining the position of said beam circumferentially around the path, an electron-collecting system including a first plurality of solid substantially sector-shaped electrodes equal in number to the number of deflecting electrodes, each such electrode being connected to a deflecting electrode for moving said beam in one circumferential direction over the electron-collecting system, and a second plurality of apertured and slotted approximately sector-shaped electrodes also equal in number to the number of deflecting electrodes, each electrode of the second plurality being also connected to a deflecting electrode for moving said electron beam in the opposite circumferential direction over the electron-collecting system, said second plurality of electrodes being mounted in front of said first set, the apertures and slots in the electrodes of the second plurality of electrodes overlapping radially, a ring-shaped electrode maintained at a positive potential mounted between the deflecting electrodes and the electron-collecting system for limiting radial movement of the electron beam, and a triggering electrode for deflecting the electron beam radially.

16. In an electronic vacuum tube counter including means for forming a beam of electrons, a plurality of deflecting electrodes positioned substantially around the circumference of a cylinder for determining the position of said beam circumferentially around a stepped circular path, an electron-collecting system including a first plurality of solid substantially sector-shaped electrodes equal in number to the number of deflecting electrodes, connections between corresponding electrodes of the said plurality and the deflecting electrodes for moving said beam in one circumferential direction over the electron-collecting system, and a second plurality of apertured and slotted approximately sector-shaped electrodes also equal in number to the number of deflecting electrodes mounted in front of the said first plurality with corresponding electrodes of the said second plurality and deflecting electrodes connected for moving said beam in the opposite circumferential direction over the electron-collecting system, the said apertures and slots extending radially and overlapping, a ring-shaped electrode maintained at a positive potential mounted between the deflecting electrodes and the electron-collecting system for limiting radial movement of the electron beam, and means including a radially triggering deflecting electrode for moving said beam step by step between the successive apertures in response to successive impulses applied thereto.

17. In an electronic vacuum tube counter including means for forming a beam of electrons, a plurality of deflecting electrodes positioned substantially around the circumference of a cylinder for determining the position of said beam circumferentially around a stepped circular path, an electron-collecting system including a first plurality of solid substantially sector-shaped electrodes equal in number to the number of deflecting electrodes, connections between corresponding electrodes of the said plurality and the deflecting electrodes for moving said beam in one circumferential direction over the electron-collecting system, and a second plurality of apertured and slotted approximately sector-shaped electrodes also equal in number to the number of deflecting electrodes mounted in front of the said first plurality with corresponding electrodes of the said second plurality and deflecting electrodes connected for moving said beam in the opposite circumferential direction over the electron-collecting system, the said slots and apertures extending radially and overlapping, a ring-shaped electrode maintained at a positive potential mounted between the deflecting electrodes and the electron-collecting system for limiting radial movement of the electron beam, and means including a triggering electrode for moving said beam around the electron-collecting system by successive steps each comprising stabilization of said beam at a slot or aperture in the second plurality of electrodes and transfer of said beam to the next adjacent slot or aperture in response to a signal to be counted.

18. In an electronic vacuum tube counter including means for forming an electron beam and electrodes for controlling the position of the beam, the combination of a plurality of deflecting electrodes positioned substantially around the circumference of a cylinder, an electron collecting system comprising a first plurality of approximately sector-shaped electrodes equal in number to the number of deflecting electrodes connected with a one-to-one correspondence to the deflecting electrodes for moving said beam in one circumferential direction over the electron-collecting system, and a second plurality of approximately sector-shaped electrodes mounted in front of the said first plurality and also connected with a one-to-one correspondence to the deflecting electrodes for moving said beam in the opposite circumferential direction over the electron-collecting system and having a series of radial counting slots and a series of radial transfer slots between the said counting slots with the counting and transfer slots interlocking radially, means including a ring-shaped electrode maintained at a positive potential mounted between the deflecting electrodes and the electron-collecting system, the electron-collecting system, and the deflecting electrodes, for stabilizing the beam successively at each successive counting slot and means including a ring-shaped triggering electrode for moving the beam to a succeeding transfer slot in response to a signal to be counted and then to the next succeeding count aperture or slot.

DAVID LIPSCOMBE HOLLWAY.
ARTHUR MELVILLE THOMPSON.

References Cited in the file of this patent

UNITED STATES PATENTS

| Number | Name | Date |
|---|---|---|
| 2,404,106 | Snyder | July 16, 1946 |
| 2,443,407 | Wales | June 15, 1948 |
| 2,452,157 | Sears | Oct. 26, 1948 |
| 2,462,292 | Snyder | Feb. 22, 1949 |
| 2,462,896 | Ransom | Mar. 1, 1949 |
| 2,488,452 | Van Overbeek | Nov. 15, 1949 |
| 2,496,633 | Llewellyn | Feb. 7, 1950 |
| 2,498,081 | Joel | Feb. 21, 1950 |
| 2,517,712 | Riggen | Aug. 8, 1950 |
| 2,522,291 | Marrison | Sept. 12, 1950 |
| 2,540,835 | Anderson | Feb. 6, 1951 |
| 2,568,449 | Hansen | Sept. 18, 1951 |
| 2,597,360 | Moon | May 20, 1952 |

FOREIGN PATENTS

| Number | Country | Date |
|---|---|---|
| 450,040 | Germany | Sept. 27, 1927 |
| 708,797 | Germany | Oct. 23, 1941 |